Sept. 7, 1943.                A. D. BLUMLEIN                    2,328,946
                    TRANSMISSION OF ELECTRICAL SIGNALS
                       HAVING A DIRECT CURRENT COMPONENT
                         Original Filed March 20, 1936    4 Sheets-Sheet 1
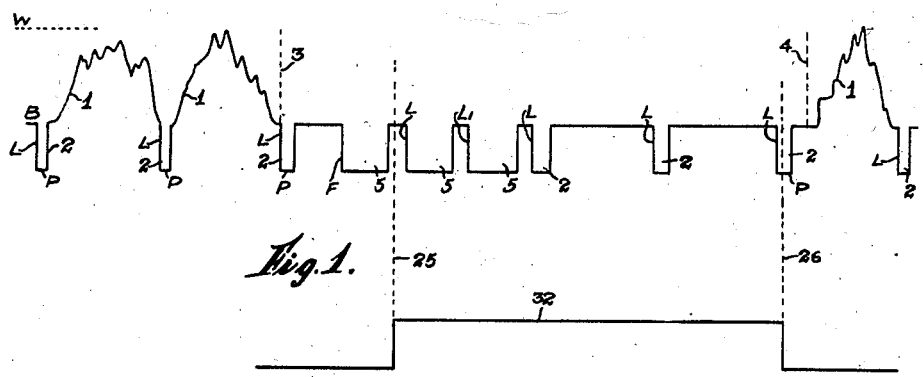
INVENTOR
ALAN DOWER BLUMLEIN
BY
ATTORNEY Sept. 7, 1943.  A. D. BLUMLEIN  2,328,946
TRANSMISSION OF ELECTRICAL SIGNALS
HAVING A DIRECT CURRENT COMPONENT
Original Filed March 20, 1936   4 Sheets-Sheet 2

INVENTOR
ALAN DOWER BLUMLEIN
BY
*H. S. Swover*
ATTORNEY

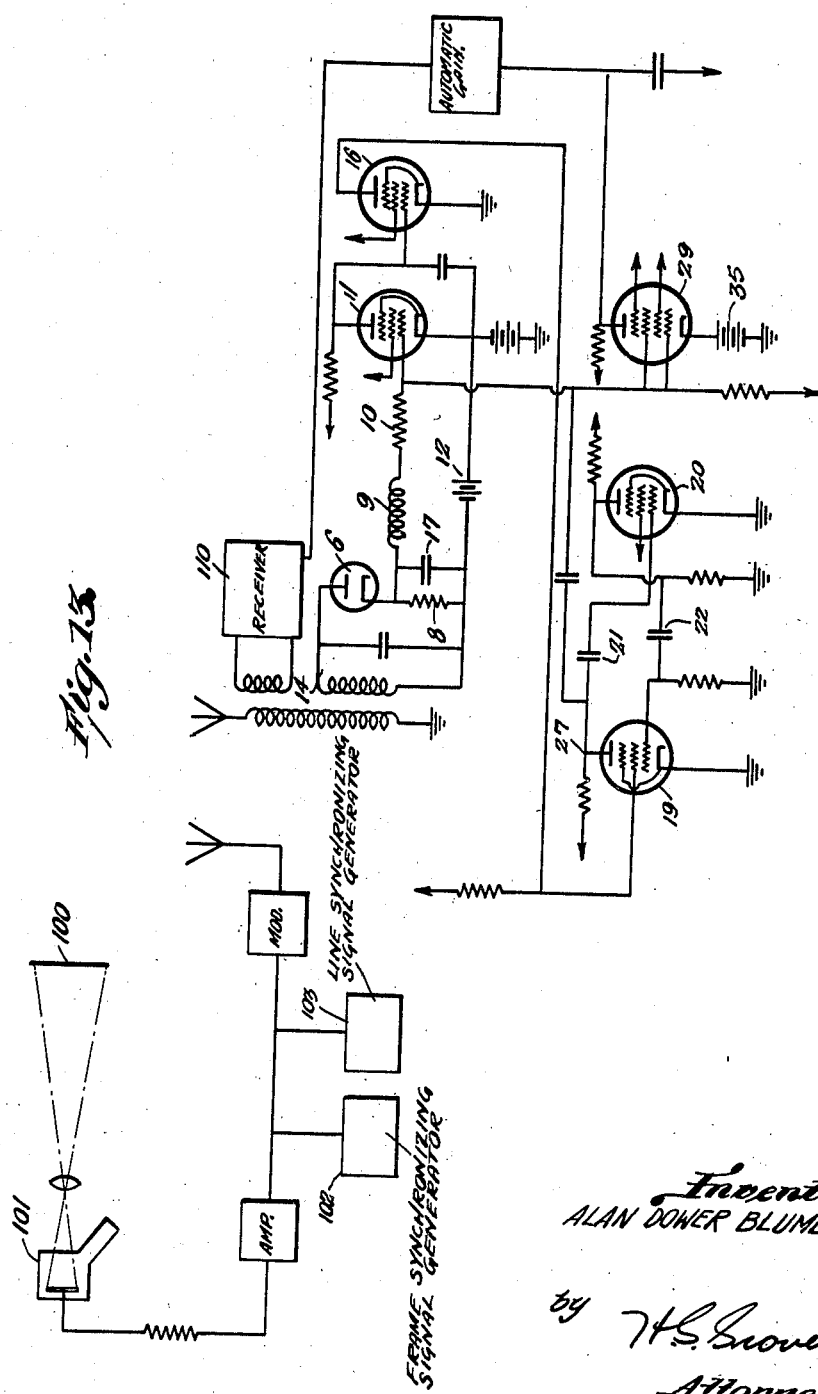

Patented Sept. 7, 1943

2,328,946

UNITED STATES PATENT OFFICE 2,328,946

TRANSMISSION OF ELECTRICAL SIGNALS HAVING DIRECT CURRENT COMPONENTS

Alan D. Blumlein, Ealing, London, England, assignor to Electric & Musical Industries Limited, Hayes, Middlesex, England, a company of Great Britain Original application March 20, 1936, Serial No. 69,831, now Patent No. 2,224,134, dated December 10, 1940. Divided and this application November 19, 1940, Serial No. 366,244. In Great Britain March 20, 1935

3 Claims. (Cl. 178—7.3)

The present invention relates to apparatus for handling electrical signals having a direct current component and comprises a division of my parent Patent No. 2,224,134, issued on December 10, 1940. The term "direct current component" is intended to include not only the actual direct current component but also signal components of very low frequency, which may be regarded as slow variations in the actual direct current component. In television, for example, the direct current component represents the average brightness of the picture transmitted and slow changes in the average brightness.

It is already known, for example, as indicated in Williams Patent No. 2,252,746, issued on August 19, 1941, that when a signal having a D. C. component is passed through a channel, such as an A. C. amplifier, which is incapable of passing the D. C. component, that component is wholly or partly lost; it is then necessary, in order to restore the signal to its original form, to reinsert the lost D. C. component.

Means have already been proposed for effecting this reinsertion, and it is an object of this invention to provide novel or improved means for this purpose. The invention also aims to provide means for correcting for the incorrect representation of the D. C. component in electrical signals.

Furthermore, where signals having a direct current component are transmitted by modulated carrier wave, it is not possible to make use at a receiver of the average amplitude of the received carrier in order to correct for varying attenuation, due for example to fading, as is commonly done in automatic gain control systems for sound broadcast receivers. This is because the average carrier amplitude changes at the transmitter not only with changes in attenuation but also with changes in the value of the direct current component.

Some difficulty therefore arises in providing means for compensating for varying attenuation. The difficulty does not, of course, arise where the direct current component is lost or suppressed at the transmitter but, to obtain the original signal at the receiver, it is then necessary to provide some means for re-inserting the missing direct current component. The use of a "stabilised" carrier, that is, one bearing the appropriate direct current modulation, is however of advantage in that for a given depth of modulation the average carrier power can be made lower than when the carrier is unstabilised.

It is accordingly a further object of the present invention to provide improved means whereby compensation for varying attenuation in a system of signal transmission by carrier wave can be obtained, irrespective of whether the direct current component of the signals is represented in the transmitted carrier or not.

The present invention accordingly provides a method of correcting for the complete or partial absence of the D. C. component, or for the incorrect representation of that component, in electrical signals representative of intelligence, which method comprises employing an observing device to develop a corrective signal which varies in magnitude in accordance with variations in the magnitude of said D. C. component, causing said intelligence signal to be effective on said observing device only at spaced intervals of time and utilising said corrective signal to establish the appropriate D. C. component in said intelligence signals.

The invention further provides a method of correcting for variations in the effective amplitude of electrical signals representative of intelligence, such as may arise in the transmission of said signals as a result of the complete or partial loss of the D. C. component of said signals, the incorrect representation of that component, or varying attenuation of the signals, which method comprises transmitting along the channel through which the intelligence signals are passed, at spaced intervals, check signals each of which has a first portion and a datum portion which, at the input of said channel, has a predetermined fixed amplitude value; at desired points in said channel, utilizing the second portion of each of said check signals to change an observing device from a normally insensitive condition to a condition in which it is responsive to the corresponding datum portion, causing said datum portions to influence said observing device to develop a corrective signal dependent upon the amplitude of said datum portions, and applying said corrective signal at a point either before or after the observing point to compensate wholly or in part for said variations in effective amplitude.

Two sets of signals are regarded as transmitted along the same channel either when they are used to modulate the same carrier wave or, if a carrier is not used, when they are transmitted along the same transmission line. The check signals may be a part of the intelligence signals themselves, or they may be interposed between trains of the intelligence signals.

The invention also provides a transmission system for transmitting electrical intelligence signals containing a direct current component and a recurrent check signal which has two portions of different amplitudes, the amplitude values of said portions in the signals to be transmitted being substantially fixed when said direct current component is present, said system comprising a transmitter having means for transmitting said intelligence signals, such for example as by modulated carrier, deprived of the whole or a part of said direct current component, and a receiver having means for adjusting the effective gain of an amplifier thereof in dependence upon variations in the difference between the amplitudes of said two portions.

A receiver for use with the system according to the preceding paragraph therefore has means responsive to the difference between two recurrent amplitude values for adjusting the gain of an amplifier thereof. The receiver may be provided with means for re-inserting the direct current component with reference to one of said amplitude values (for example in the Patent No. 2,252,746, supra), and means for thereafter deriving a gain controlling voltage from the amplitude of the other of said amplitude values.

The invention will be described, as applied by way of example to television, with reference to the accompanying drawings, in which Figures 1 to 3 are explanatory diagrams.

Figures 4, 5 and 6 are circuit diagrams illustrating parts of apparatus according to this invention.

Figure 13 is a schematic diagram of a system embodying known transmission apparatus, and the apparatus of Figs. 4 and 5.

Figure 11:
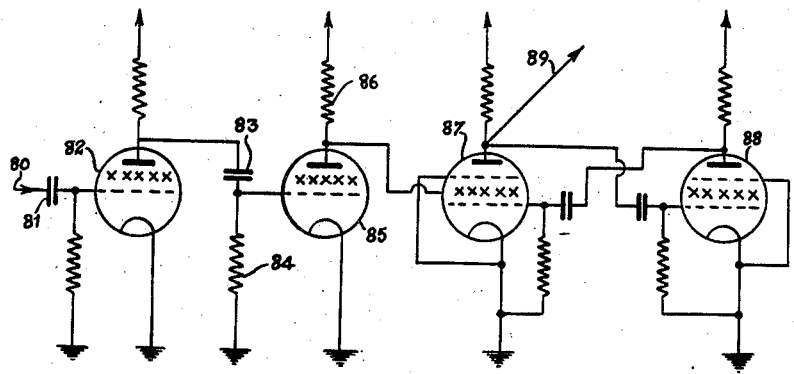
Figure 11 illustrates a part of apparatus for carrying the invention into effect.

Figure 1 shows a form of television signal which may be used in carrying out the present invention. Picture signals 1 are interspersed with line synchronising impulses 2, occurring between the scanning of adjacent lines of the object to be transmitted. The line marked W indicates the picture signal amplitude representative of the brightest element of the object, the line marked B corresponds to the amplitude level of a "black" signal and the synchronising impulses are seen to be in the "blacker-than-black" direction.

The dotted line 3 indicates the end of the last line of one traverse or frame of the object and the dotted line 4 indicates the commencement of the next frame. In this interval there is transmitted a frame signal comprising, in the present example, three pulses 5. The leading edges L indicate the commencements of the line impulses and the leading edge F that of the frame signal. The line impulses and the frame signal serve to control the generation of saw-tooth oscillations at the line and frame frequencies respectively in known manner. The particular form of frame signal shown in Figure 1 is intended for use in interlaced scanning where the lines traced in one traverse of the image interlace with the lines traced in the next traverse; in the present example the image is completely scanned in two traverses thereof and in such a case it is desirable that the broad pulses 5 constituting the frame signal should occur at double the line impulse frequency during the frame interval, so that the frame signal should always have the same energy content in spite of the fact that the leading edge of one frame impulse occurs at point F in Figure 1, whilst the next frame impulse will be displaced by half a line interval relatively to this. For this reason, the broad pulse having the leading edge $L_1$ is provided in the present example.

The signal of Figure 1 will be assumed to have been used to modulate a carrier in such a way that the direct current component is present at the modulating point, so that any given value of ordinate in Figure 1 will correspond to a fixed carrier amplitude. Further, the modulation will be assumed to have been so effected that the carrier amplitude is reduced substantially to zero on the peaks P of the synchronising pulses.

Referring now to Figure 4, it will be assumed that there is applied from a suitable radio receiver to the tuned circuit 14 the modulated carrier referred to in the preceding paragraph. It will further be assumed that the carrier is subject to varying attenuation and that it is desired to correct for this at the receiver.

The signals developed across the circuit 14 are rectified by the diode rectifier 6 giving a rectified signal across a condenser 7 and resistance 8. The time constant of these elements 7 and 8 is so short that the voltage across condenser 7 follows the envelope of the modulating signals; in fact, a voltage wave of the form shown in Figure 1 will be set up across condenser 7. The rectified signals so obtained are taken through a radio frequency choke 9 and high resistance 10 to the control grid of valve 11. With negligible radio frequency signal (on the peak of a synchronising pulse) this valve 11 is biased to anode-current cut-off by the battery 12. For any signal of about "black" amplitude, or greater, the valve 11 is conducting and keeps a condenser 13 discharged. During the synchronising pulses 2 and 5, the condenser 13 charges through a resistance 15, and during a long frame pulse 5, sufficient charge is accumulated on the condenser 13 to take the potential of the control grid of a valve 16 to a value above that corresponding to anode-current cut-off; battery 17 serves to bias the control grid of valve 16, and the valve 11 serves to provide a positive pulse on the grid of valve 16 at the occurrence of the first frame pulse 5. The anode of valve 16 and the screen grid of a valve 19 are fed through a common resistance 18. Valves 19 and 20 are connected as a "multi-vibrator," their grids being cross-connected to their anodes through condensers 21 and 22 and being connected to earth through leak resistances 23 and 24. The condenser 21 is of comparatively large capacity so that, with resistance 23, it forms a circuit having a time constant which is long compared with the frame period, that is, the time interval between successive occurrences of the leading edge F of Figure 1. The leak 24 is made adjustable. The multivibrator tends to seek its relatively more stable condition in which valve 19 is conducting and valve 20 insulating. The first series of flame pulses 5 (Fig. 1) which arrives makes valve 11 insulate for long enough to allow condenser 13 to charge up sufficiently to make valve 16 conductive. This lowers the potential of the screen grid of valve 19 and makes this valve insulate. When valve 19 insulates, its anode becomes more positive and the resulting positive pulse on the control grid of valve 20 makes this valve conduct, and the control grid of valve 19 is driven negative. After a short period, the charge on condenser 22 leaks away through resistance 24 and valve 19 becomes conductive once more, driving valve 20 to a non-conductive state in which, owing to the long time constant of elements 21 and 23, it remains until the next series of frame impulses arrives.

By suitably adjusting the value of resistance 24 it can be arranged that the valve 19 remains insulating for nearly as long as the interval between frames, that is, the interval between lines 3 and 4 in Fig. 1. The interval during which the valve 19 is insulating may thus commence during or just after the arrival of the first pulse 5 and may end just before the picture signals commence again, for example, during the last line impulse of the interval between successive frames. A suitable insulating interval is that indicated between lines 25 and 26 in Fig. 1.

The circuit of Fig. 4 is illustrative of circuits which may be used to develop a control signal which can in turn be used to render sensitive a correcting device which at other times is insensitive. This correcting device serves to develop a corrective current or voltage for correcting for any variations which may take place in the attenuation undergone by the received signal with reference to the part of the received signals occurring during this "sensitive" interval. Many other forms of circuit can, of course, be used in place of that shown in Fig. 4.

In Fig. 4 a control signal is developed at points 27 and 28, the signal at the former point being in the positive sense and that at the latter in the negative sense. The form of the control signal developed at 27 is shown in Fig. 2.

Figure 5:
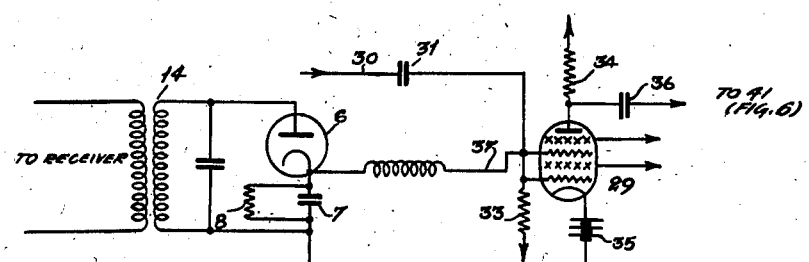

A part of a correcting device according to the invention which is suitable for use with the arrangement of Fig. 4 is shown in Fig. 5. The received carrier is applied as in Fig. 4 to a tuned circuit 14 and is demodulated by a diode detector 6 having a condenser 7 with a parallel load resistance 8 connected as shown. The elements 14, 6, 7 and 8 need not be duplicated in the circuit of Fig. 5 because, if desired, the required voltages may be taken from the terminals of condenser 7 of the apparatus of Fig. 4, in which case it is to be noted that the cathode of valve 29 of Fig. 5 is conductively connected to earth through batteries, 35, 12 and 17. Voltages may also be taken, if desired, from the same terminals to supply the picture reconstituting device. Alternatively, some or all of the elements referred to may be separate for the different parts of the receiver circuit, in which case the negative end of battery 35 of Fig. 5 should be earthed.

The wave form of the kind shown in Fig. 1, developed across the condenser 7 of Fig. 5, is fed to the outer control grid of a hexode mixer valve 29. Positive pulses, such as those shown at 32 in Fig. 2 which may be derived from point 27 in Fig. 4, are applied at 30 through a condenser 31 to the inner control grid of the valve 29. The inner control grid is suitably biased through a leak 33, and the bias valve may be so adjusted that the inner grid comes to cathode potential during each pulse 32 but falls in the intervals between pulses 32 to such a negative value that the valve 29 is then entirely inoperative. By giving the bias voltage a value slightly less negative than required for the above purpose, it can be arranged that the grid automatically fixes itself during the pulse at about cathode potential, owing to grid current charging the feed condenser 31. The outer control grid of valve 29 is biased by a battery 35 so that with negligible incoming radio signals (peaks P of the synchronising pulse) the outer control grid will cut off or at least very considerably reduce the anode current, even if the inner control grid is at cathode potential. When, however, a signal representing black occurs, the outer grid will allow curent to flow to the anode whenever the inner grid allows the valve to conduct. The anode current of the valve 29, during periods in which the inner grid allows the valve to conduct, will have a wave form which is the same as that of the part of the signal of Fig. 1 between dotted lines 25, 26, while at all other times the anode current will be zero or substantially zero.

Fig. 3 shows the wave form of the anode current of the valve 29. The dotted parts of the curve show the current that would be obtained were the inner grid switched on all the time, and the full line part of the curve shows the actual anode current. In order that the valve 29 may operate efficiently, it can be arranged that the outer grid is arranged to be at approximately cathode potential for a signal representing black amplitude. Although the picture signals will drive the outer grid more positive than the cathode, no grid current will flow, since the valve is biased to cut-off by the potential on the inner grid thereof at all times except during the frame intervals. The anode current of valve 29 is dependent upon the amplitude of the signals in the blacker-than-black sense occurring during the frame interval and this amplitude is dependent on the amplification or attenuation of the transmission path supplying the signals, and is independent of the average brightness of the picture. The anode current may therefore be used to actuate automatic gain control means.

The magnitude of the D. C. component of the anode current of valve 29 will vary in accordance with variations in the amplitude representing black, and the voltage across the anode resistance 34 may therefore be used, after smoothing to provide a D. C. potential for operating controlling devices, e. g., variable-mu valves for automatic gain control.

Alternatively, the A. C. component of the anode curent may be passed out through a condenser 36 and may be amplified to provide an A. C. controlling wave.

Figure 6:
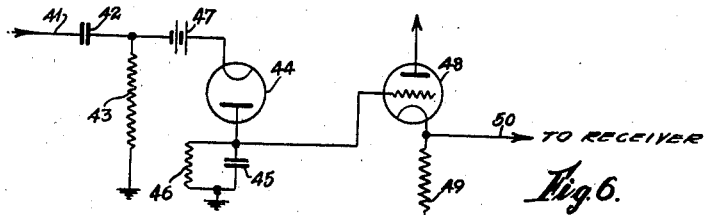

Figure 6 shows a circuit, employing the latter method, by which the A. C. controlling wave referred to may be utilized. The signals taken off through the condenser 36 of Figure 5, after amplification if desired, are fed from terminal 41, through condenser 42, to a resistance 43. The signals should be fed in at 41 in such a way that the pulses in the direction P to B in Figure 3 during the frame interval are in the negative direction. The A. C. voltage set up across resistance 43 is fed to a diode rectifier 44, which, owing to the values chosen for the condenser 45 and the load resistance 46, operates as a peak rectifier. Any alteration in the black amplitude of the incoming signal (that is, of the level B in Figure 3) will introduce a change in the amplitude of the A. C. wave fed in at 41, and a corresponding change in the rectified voltage set up across condenser 45. The rectifier 44 is shown so connected as to produce a negative potential at the upper terminal of condenser 45 with respect to earth. By providing suitable amplification between the valve 29 of Figure 5 and the rectifier 44 of Figure 6, it can be arranged that a small change in the black amplitude produces a very large change in rectified voltage set up across condenser 45.

If it is required to hold the resultant signal to fairly close limits, a battery 47 may be inserted in series with the rectifier, so as to prevent rectification taking place until the black signal reaches a predetermined value. Any small increase in the black signal will then produce a comparatively large negative voltage across the condenser 45 and this voltage may be used for controlling the grid bias of radio-frequency amplifier valves in the receiver, so that an increase of black amplitude automatically reduces the gain of the receiver. If it is arranged that a small increase of black amplitude produces a very large change in voltage at condenser 45, the condenser 45 and leak resistance 46 should be given a sufficiently long time constant to prevent an unsteady state arising in which the apparatus as a whole might tend to "hunt." In any case, the time constant of condenser 45 and leak resistance 46 should preferably exceed by several times the time interval between successive frames. As the leak resistance 46 may have a relatively high value, it may be desirable to pass the rectified voltages through a further valve (48, Figure 6) before utilization, in order to ensure that leakages in the utilization circuits do not affect the voltage across condenser 45. The valve 48 has its anode connected to a suitable source of high tension (not shown), and its cathode fed from a negative voltage source (not shown) through a comparatively high resistance 49. The voltage of the cathode of the valve 48 will then follow almost exactly the voltage of the grid of that valve, and the voltage on the cathode can be utilized at 50 for any required purpose. For example, the connection 50 may be taken to provide the bias for the grids of variable-mu valves in the radio-frequency amplifier of the wireless receiver. Alternatively, if desired, instead of controlling the amplification of a circuit preceding the device of Figure 5, the amplification of a later amplifier can be controlled.

The invention has so far been described with reference to the correction of a variable attenuation which equally affects the whole transmitted wave. This invention can however also be utilized for re-inserting the direct current component into the signals, assuming that the signals are not subject to varying attenuation. For example, suppose that television signals are fed through an amplifier channel of steady amplification which does not however transmit the direct current component. Such signals may be fed in to a circuit such as shown in Figure 5 at the point 37 (the radio frequency rectifier 6 being omitted). As before, signals are fed in at 30 to render the valve 29 responsive for a period during the interval between frames. The direct component of the anode current of valve 29 is then proportional to the absolute amplitude of the black pulses fed into this valve, and the potential drop across the resistance 34 in the anode circuit due to this direct component may be utilized to re-insert the D. C. component of the signals fed in at point 37. These signals are preferably fed in at 37 through a condenser, the grid to which they are applied being connected through a leak resistance to the cathode of valve 29. The anode circuit resistance 34, shunted by a condenser, is then conveniently arranged between the cathode of the valve 29 and the negative terminal of the anode current source (not shown) and the potential of the cathode is applied through a grid leak to the control grid of a subsequent valve to provide a bias therefor; in this arrangement, it should be arranged that only the anode current, and not the screen grid current of valve 29 passes through the resistance 34, and this can be achieved by supplying the anode and screen grid from different current sources. Black level is then represented by a potential at the cathode of valve 29 which is positive with respect to earth, and which can be employed to bias the control grid of a further valve to which the alternating component of the signal is fed in a sense opposite to that of signals fed to valve 29. In another arrangement, the cathode of valve 29 is earthed, and the anode resistance 34 is inserted between the cathode and the negative terminal of a source of current which is arranged to supply the anode but not the screen grid; grid bias for the further valve can then be taken from the junction point of resistance 34 and the anode current source.

The signals fed to the further valve mentioned in the preceding paragraph may be obtained from lead 37 of Figure 5, and another valve may be inserted if desired to reverse the phase of the signals. The magnitude of the direct component of the potential difference set up across resistance 34 may be adjusted so as to ensure correct re-insertion of the D. C. component by adjustment of the value of resistance 34.

In a further example of the use of this invention, a television wave such as that shown in Figure 1, is transmitted through a channel wherein, although the absolute gain for the picture signals is substantially constant, the D. C. component and the amplification of the synchronising pulses vary owing to the variations say of H. T. voltage and the effect of curved amplification characteristics.

An example of such a use will be described with reference to Fig. 7. This figure represents a typical form which the input circuit to the modulator of a transmitter for television signals may take. The amplified television signal wave such as is shown in Fig. 1 is fed in at 51 through a condenser 53 to the grid of a modulator 52. The sense of this wave is such that the picture signals are negative and the synchronising signals positive. The grid of the valve 52 is connected to the cathode through the leak 54, and this leak, together with a diode 55, serves to re-establish the direct current component of the applied signals on the grid of valve 52 with reference to peak values P of the signals. The absolute value of the voltage of the grid 52 which represents the synchronising pulse is fixed by the negative bias supplied to the cathode of diode 55 through a connection 56, as will hereinafter be explained. The stabilization (or re-inserting) circuit comprising elements 53, 54, 55 operates in the manner described in United States Patent No. 2,252,746 to Williams, supra.

The anode circuit of the valve 52 comprises a floating anode battery 57 and a modulator resistance 58, and the television signals appearing across resistance 58 thus contain their direct current component. The upper end of resistance 58 is connected through a source 59 for providing the desired bias voltage to the grids of two push-pull connected triode modulator valves 60; the grids of these valves are fed with radio frequency oscillations of carrier frequency through the coils 61 and 62. The radio frequency output from the anode of the valves 60 is then passed through further radio frequency amplifiers (not shown) if required, to the aerial.

The wave form of the signals fed in at 51 is such that the ratio of synchronising signal amplitude to picture signal amplitude is larger than is required in the final modulated output of the transmitter. This relative increase of synchronising signal input allows for the curvature of the characteristic of the modulator and further amplifier stages.

It is arranged that the peaks P of the synchronising signals cause the radio frequency output to fall to substantially zero, which means that the synchronising signals must modulate the transmitter over the curved and less efficient lower part of the modulation and amplification characteristics. Since the synchronising signals are of a substantially square-topped wave form, there will be no wave-shape distortion other than a relative attenuation due to the operation over the curved part of the modulator characteristic, so that this part of the characteristic can be used for the synchronising signals, leaving the upper straighter part for the picture signals. The resultant radio-frequency output at the aerial of the transmitter has then a range of values corresponding to particular light intensities in the object of which an image is to be transmitted, and a value, substantially equal to zero, corresponding to the peaks of the synchronising signals. Although this latter value is normally zero, it is often inconvenient to provide sufficient synchronising signal input to modulate the transmitted carrier right down to zero amplitude by swinging the modulator around the bottom bend of its characteristic.

At the receiver, correct representation of absolute brightnesses is obtained either by providing a direct current coupling between the demodulating detector and the light-modulating means, such as the control electrode of a cathode ray tube, or by allowing the D. C. component to be suppressed and then re-establishing the D. C. component with reference to the peak amplitude P of the synchronising pulses previous to application of the signals to the light-modulating device. If now the carrier amplitude representing black varies, or if the received amplitude representing the difference between the peaks P of synchronising pulses and black varies, the direct current or average picture brightness component will effectively vary at the receiver. For example, a slight fall of the carrier value representing black, or the amplitude of the synchronising pulses relative to black, will cause the screen of the cathode ray tube to be darkened. Such darkening will be relatively unimportant in the high lights, but may be sufficient to obscure detail in the dark parts of the picture, due to the very dark greys and blacks becoming simultaneously black.

Figure 7:
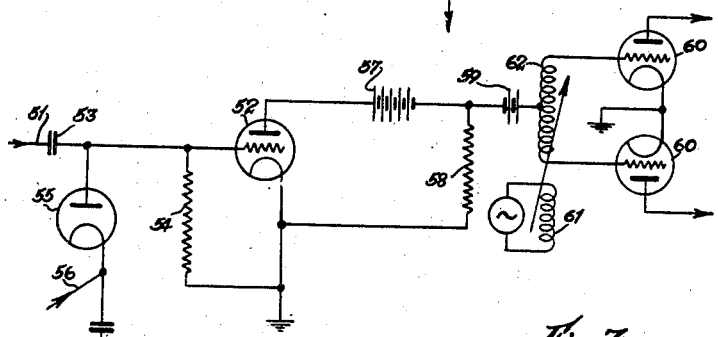
Figure 7 is a circuit diagram illustrating a further form of the present invention.

Variation in the carrier amplitude representing black, or of the received amplitude representing the difference (P to B, Fig. 3) between the peaks of the synchronising pulses and black may be caused for example by variation in the voltage of the source supplying the anode circuits of the modulator or radio frequency amplifiers at the transmitter, or by variation in the voltage of battery 57 in Fig. 7. The effect of the variation at the receiver will be the same whichever of the two methods, above referred to, of ensuring that the D. C. component is present at the light-modulating device is used. Unless the carrier amplitude representing black remains constant, and if the synchronising pulses extend over the curved parts of the characteristics of the receiver valves, it is impossible to keep constant the amplitude of the peaks P of the synchronising pulses with respect to black B because different peaks will extend to different extents along the said curved parts; the correct re-insertion of the D. C. component with reference to the peaks P is thus rendered impossible. It is therefore difficult to maintain a correct representation of the average picture brightness at the receiver and, when the variations in question are considerable, it may prove difficult to separate the synchronising signals correctly from the picture signals.

In order to correct for variations of the kind above described, therefore, it may be arranged, according to a feature of the present invention, to feed in at point 56 in Fig. 7 a voltage which varies in such a manner as to keep the "black" level of the carrier output at a constant value in spite of the variations referred to.

One way in which this may be done is to feed modulated carrier frequency energy from the transmitter of Fig. 7, or from the transmitting aerial, to the circuit 14 of an arrangement such as that of Fig. 5. Signals of the form shown by 32 in Fig. 2 are applied at point 30 in Fig. 5. These signals may, for example, be generated with the aid of a circuit such as that of Fig. 4, or may be derived from a part of the mechanism which serves to generate the synchronising signals. The output of the valve 29 will be proportional to the carrier amplitude corresponding to black, less any effect due to slight variation in the carrier amplitude representative of the peaks P of the synchronising signals, if this is not quite zero. The A. C. component of the output of valve 29 may therefore be fed, after any necessary amplification to terminal 41, and thence into the device of Fig. 6; here, as already explained, there are developed across resistance 49 voltages which can be arranged to vary substantially with relatively small variations in the level corresponding to black in the signals fed in at 37 in Fig. 5.

The output obtained at point 50 in Fig. 6 may then be applied to control the potential of point 56 in Fig. 7. In the particular arrangement shown in Fig. 6, an increase in "black" amplitude produces a negative voltage at 50, whereas a positive voltage is required at point 56 of Fig. 7 in order to correct such an increase in amplitude. To overcome this difficulty, the sense of the input to the diode 44 in Fig. 6 may be made opposite to that previously described; the diode 44 and battery 47 are then also reversed. The point 50 in Fig. 6 may then be connected, by means of a direct-current connection which may if necessary include a source of biasing potential, to point 56 in Fig. 7 to give the desired result.

Alternatively, there may be applied to point 56 of Fig. 7 a voltage proportional to the direct component of the current flowing in the valve 29 of Fig. 5; this may be achieved, for example, by inserting a resistance in the cathode circuit of the valve 29, as described above in connection with the reestablishment of D. C., and the catode of th valve 29 may then be connected to point 56 of Fig. 7.

Instead of injecting the control voltage at point 56 of Fig. 7, it can be arranged that the potential at point 50 in Fig. 6 is effective in controlling the amplitude of the synchronising signals applied at the point 51. For example, before the synchronising signals are mixed with the picture signals, they may be passed through an amplifier having its amplification controlled suitably in accordance with the voltage at point 50 of Fig. 6. If the amplification is controlled by variation in the bias of one or more variable-mu valves, a lead may be taken from the point 50 to the control grids of these valves in order to control the bias thereof. In such an arrangement, the apparatus of Figure 6 is connected up as shown, and signals are applied at point 41 in the same sense as that mentioned in the original description of that figure. An increase in black amplitude accordingly produces a negative voltage at point 50, tending to reduce the amplification of the synchronising signal amplifier and thus tending to reduce the black amplitude.

Figure 10:
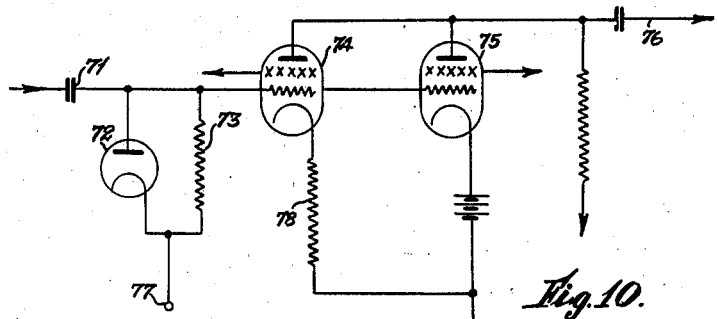
Figure 10 shows a further circuit arrangement illustrative of a feature of the present invention.

In a system in which the carrier amplitude is not reduced to the neighbourhood of zero on the peaks of the synchronising signals, it can be arranged that the black signals alone are effective in producing a voltage for controlling the black level. Such an arrangement would not take count of changes in the amplitude P to B in Figure 3 unless such changes were accompanied by changes in the black level. This result can be obtained with the circuit of Figure 5 by biasing the valve 29 so that the synchronising signals carry the outer control grid well below cut-off, so that variation in the amplitude of the synchronising signals is not effective in changing the anode current. The anode current is then controlled in accordance with changes in the amplitude of the black signals (B Figure 3).

Where it is undesirable or inconvenient to apply a correction to the synchronising signals before they are mixed with the picture signals, the synchronising signal amplitude may be increased or decreased relatively to the picture signal amplitude by passing the composite signal comprising mixed synchronising and picture signals through a suitable circuit. Such a circuit may comprise a thermionic valve, the curvature of the characteristic of which can be varied under the control of a voltage such as that obtained from point 50 in Figure 6. An example of a circuit of this kind is shown in Figure 10. The composite signal having the form shown in Figure 1 for example, is fed through a condenser 71 on the grids of two valves 74 and 75; the signal fed in loses its D. C. component, if that component is present, in its passage through condenser 71. The sense of the signals is such that the synchronising signals are positive. A diode 72 and leak 73 serve to re-insert the D. C. component into the signals with reference to the peaks P of the synchronising signals. The cathode of valve 74 is connected to earth through a resistance 78 which reduces the mutual conductance of the valve and lengthens and straightens its characteristic. The valve 75 has its cathode biased very positively so that the valve is inoperative for the negative picture signals on its grid but is operative to give increased amplification for the synchronising signals. The combined output of the valves 74 and 75 is passed out at 76.

A control voltage, such as that from point 50 in Figure 6, is applied at point 77 and is effective in altering the bias on the valves 74 and 75. Thus an increase in the "black" level of the outgoing signals will produce a negative voltage at 77 which will reduce the amplitude of the synchronising signals, so tending to neutralise the change in "black" level.

In the systems so far described, the corrective effect is derived from an "observation" of the "black" level during the intervals between frames.

Where the line synchronising signals do not occupy the whole of the interval between successive trains of picture signals representative of successive lines of the object, however, use may be made of an "observation" in this interval (which may be called the line interval) to derive a corrective effect. A line synchronising impulse usually occupies about one tenth of a line period and the other nine tenths is usually occupied by picture signals.

Figure 8:
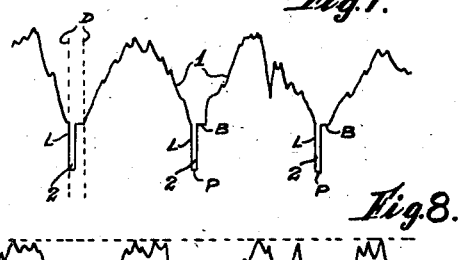
Figures 8 and 9 are further explanatory diagrams.

In Figure 8 is shown a wave form in which the line synchronising impulses 2 occupy only a fraction of the line interval D, for example a quarter of this interval. Thus the impulse lasts for one fortieth of a line period and during three fortieths of a line period the signal is at "black", indicated by reference B. With such a signal it is possible to derive a corrective effect once every line and a more rapid control is therefore possible than with the signal of Figure 1. Signals of the kind shown in Figure 8 may be useful for example for providing automatic gain control for the receiver of a relay station receiving signals from a moving transmitter, for instance of the type which may be used in moving vehicles, or over some other channel subject to rapidly varying attenuation, with a view to retransmitting the signals after correction.

If the maximum possible rapidity of action is desired with signals of the kind shown in Figure 8, the signals in the frame interval should preferably differ from those shown in Figure 1. Thus each of the pulses 5, Figure 1, may be constituted by an excursion (as F, L and L₁) to level P to form a pulse lasting one fortieth of a line period, a return to level B for an interval of three fortieths of a line period, a further excursion to level P for a time equivalent to three tenths of a line period followed by a return to level B.

The signals of Figure 8 may be utilized in a circuit which is a modification of that shown in Figure 4. In the modification, the valve 11 and resistance 10 are omitted and the output of the rectifier 6 is taken from the choke 9 to the grid of the valve 16. Further, the rectifier 6 is inverted, so that picture signals produce a rectified voltage in the negative sense. The valve 16 is so adjusted or biased that it does not pass current for the negative voltages representing picture signals. At the occurrence of a line synchronising signal however, the valve 16 conducts, thus triggering the multi-vibrator comprising valves 19 and 20. The leak 24 is adjusted so that the valve 19 remains insulating from the moment of triggering to just before the beginning of the next train of picture signals, that is for most of the one-tenth of a line period. Instead of making the condenser 21 so large that the multi-vibrator is quasi-aperiodic, it may be found advantageous to make the natural period of the multi-vibrator just longer than a line period, so that the device tends to run at the required frequency. The amplitude tof the pulses required from valve 16 is thus reduced. The output at points 27 and 28 then takes the form of pulses occurring at the line frequency, each pulse having a length slightly less than one tenth of a line period.

The pulses from point 28 may be fed in at point 30 to the apparatus of Fig. 5, and may control the valve 29 to give output signals at 36 dependent on the black amplitude occurring in the short interval between a line synchronising pulse and the beginning of the picture signals of the next line. The signals set up at point 36 may be amplified and passed to a circuit such as that of Fig. 6 for producing a control voltage at 50. In this case, the time constant of condenser 45 and leak 46 may be made much smaller than that employed for "observation" once per frame, so that a more rapid control is obtained. The time constant of elements 45 and 46 should, however, be made sufficiently greater than the line period to prevent any instability of the control.

The examples given above are of systems in which the black level is "observed" and a corrective signal dependent on this observation is injected at a point earlier in the system than that at which the observation is made so as to correct as far as possible any variation of black level at the point of observation. The invention is also applicable to systems in which the controlling signal is utilized to correct the black level at some point after the point of observation. For example, in the automatic gain control systems described above, the control signal developed at point 50 in Fig. 6 may be used to control the gain of amplifiers following the point of observation. Alternatively, where large variations of transmission efficiency are to be corrected, it may be arranged that the corrective signal serves to vary the amplification both before and after the point of observation. For example, the control voltage at point 50 in Fig. 6 may be utilized to control the radio frequency amplication ahead of the rectifier 6 in Fig. 5; such a control may, for example, reduce the variation of the black level at the rectifier 6 in Fig. 5 to 10% for a 40 decibel change in incoming signal strength; the control voltage at point 50 in Fig. 6 may also serve to produce a slight variation in the amplification following the observation point (e. g., the modulation frequency amplification following the rectifier) so that a 10% change of black level at the observation point produces a 10% compensating change of gain following it, thus ensuring that the final output signal is substantially free from any variation.

The arrangements so far discussed are based on an observation of the black amplitude. The invention can also be carried into effect by an observation of any definite picture amplitude, or of an amplitude related to a definite picture amplitude. For example, instead of the wave shown on Fig. 8, the wave shown in Fig. 9 may be transmitted. In this case, during the interval between the synchronizing pulse and the beginning of the next line, the signal amplitude assumes a value E which lies between the synchronising peaks P and the black amplitude B. Such a signal level may be fixed as being a certain fraction of the distance between P and B or, alternatively, if the amplitude of the synchronising impulses from the black level varies, may be defined as being below the level B by a certain fraction of the amplitude relatively to the level B of the maximum white signal W.

Figure 9:
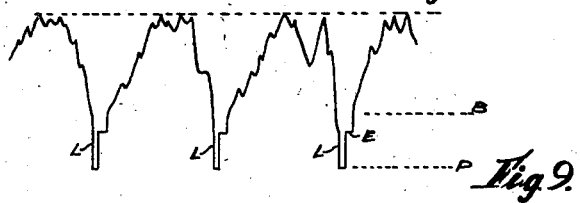

A signal of the type shown in Fig. 9 may be useful for direct reception by the use of a cathode ray tube, the slightly "blacker-than-black" signals E serving to black out the cathode ray during the scanning return strokes. Such a signal may be "observed" by the use of circuits similar to those employed for the wave of Fig. 8, but with suitable modification and adjustment.

Similarly, a wave form may be employed in which, during the interval between a line synchronising signal and the picture signals of the next succeeding line, the signal amplitude corresponds to a value within the picture range, say half way between black B and white W. Such a wave form provides a strong controlling signal, but it may be found necessary to provide means to "black out" this signal so as to prevent its appearance in the reproduced picture.

Further, a wave of the kind last referred to may with advantage be used in a system which involves relaying a signal to a final transmitter; after the corrective signal has been derived and used to correct the signal, the excursion into the picture range occurring in the line intervals may then be suppressed before final transmission of the signals.

Similarly, wave forms of the kind shown in Figures 8 and 9 may be converted before final transmission to the form shown in Figure 1, for example by superimposing upon the signals pulses such as those developed by the multi-vibrator 19, 20 of Figure 4 when used with a wave of the kind shown in Figure 1 and then limiting the resultant pulses to the required amplitude.

A radio relay station for a television transmission system may employ the corrective means according to the present invention more than once. For example, the wave received at the relay station may be of the general form shown in Figure 8 and may be observed once per line. The radio frequency gain may then be adjusted automatically as already described in dependence upon the observation. A further automatic adjustment of gain may then be carried out in order to correct for the error remaining as a result of the fact that slight changes in the black level at the observation point are necessary to develop a corrective signal for controlling the gain of a preceding amplifier. The corrected modulation frequency output may be passed through a circuit adapted to increase the relative amplitude of the synchronising signals so as to compensate for the subsequent reduction of the amplitude of these signals by the curved characteristic of the transmitter. Simultaneously, the wave form may, if necessary, be converted to the form shown in Figure 1 or Figure 9 so as to be more suitable for final reception. The wave may then be applied to the transmitter and the radiated signal level corresponding to black may be controlled by one of the methods already described. For this latter control, observation may be made once per line for waves of the general form of Figures 8 and 9 or once per frame for waves of the general form of Figure 1.

In a further modified arrangement based upon that described with reference to Figure 4, the synchronising pulses are again caused to generate the required switching signals, which in turn are employed to turn on the observing valve. In the modified arrangement, using the wave form shown in Figure 8 or 9, the synchronising pulses P are separated from the vision signals in the manner described in British Patent No. 422,-824 and in the corresponding U. S. Patent No. 2,194,514, issued to Williams on March 26, 1940. The separated pulses are then suitably delayed by a delay network and inverted by subjecting them to one state of valve amplification, after which they can serve to make sensitive an observing valve such as valve 29 of Figure 5 during a part of the period B or E in Figures 8 and 9.

In a practical case, however, a wave form is employed which is similar to that shown in Figure 8, but which differs in that the synchronising pulse lasts for one tenth of the line period while the black interval B lasts for one twentieth of the line period. Signals of this wave-form are illustrated on page 373 of the issue of "The Wireless World" of the 4th October 1935. The method last described is clearly not applicable here, since the synchronising pulse lasts longer than the black interval; there is, therefore, employed an alternative method in which the observing valve is turned on by a pulse obtained not from the leading edge of the synchronising pulse but from the trailing edge.

Apparatus for carrying this method into effect is illustrated in Figure 11; signals of the form shown in Figure 8, but with synchronising pulses lasting longer than the black intervals B, are fed in at 80 through a condenser 81 to a valve 82, it being arranged that the synchronising impulses are in the positive sense on the control grid of valve 82. The valve 82 serves in the manner described in United States Patent 2,194,514, supra, to separate the synchronising pulses from the picture signals, that is, its control grid tends to assume zero potential at the peaks P of the synchronising pulses, the picture signals lying beyond anode-current cut off.

In the anode circuit of valve 82 is a small condenser 83 and a resistance 84 in series, the arrangement being such that differentiated synchronising pulses are set up across resistance 84; at the beginning of each pulse a sharp negative pulse appears at the top of resistance 84, while at the trailing edge of the pulse a positive pulse appears at that point. The positive pulse causes the anode current of a valve 85 to increase; the anode circuit of valve 85 contains a resistance 86, and the potential of the anode of valve 85 consequently falls.

A negative pulse is thus passed to the screen grid of valve 87, which, together with valve 88, forms a multivibrator, and the multivibrator is triggered off.

The multivibrator is so adjusted that a positive pulse is set up at the anode of valve 87 during each black interval B, and this pulse may be taken off at 89 and employed to actuate an observing valve, such as valve 29 in Figure 5. It is to be noted that, in the practical wave form referred to above, the frame signals each comprise a plurality of pulses of longer duration than the line pulses, successive frame pulses being separated by black intervals; the multivibrator is thus triggered off by the trailing edges of both the line and frame pulses, and the observing valve is thus switched on during the black intervals following the frame pulses as well as during those following the line pulses.

If desired, the multivibrator 87, 88 may be omitted, the pulse from valve 85 being broadened by means of a low-pass filter, reversed in sense in an amplifying valve, and fed directly to the observing valve.

Figure 12:
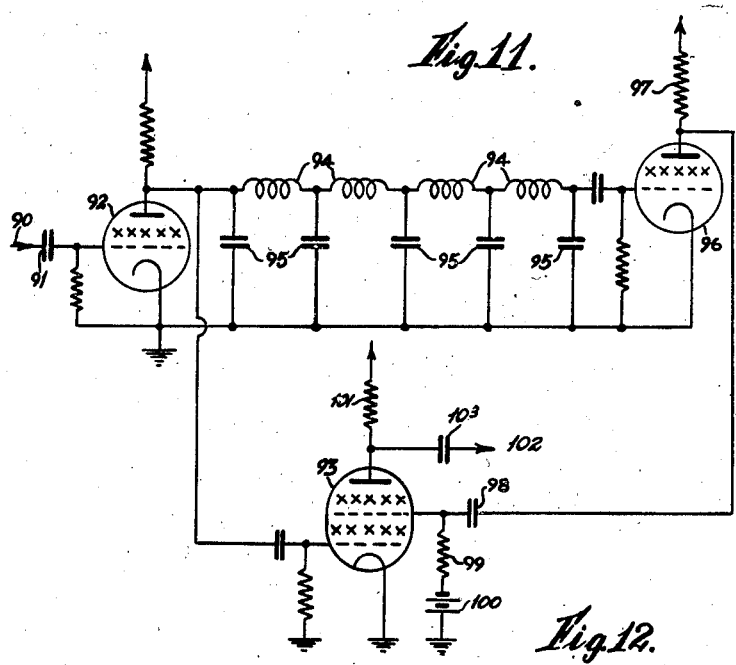
Figure 12 shows a further form of apparatus according to the invention.

A further form of apparatus suitable for use in generating a signal for actuating an observing valve, which is particularly suitable for use with a signal of the form shown in Figure 8, but with synchronising pulses of longer duration than the black interval B, is illustrated in Figure 12. Signals of the form mentioned are fed in at point 90, through condenser 91, to a valve 92, which serves the same function, and operates in the same manner as valve 82 of Figure 11. Synchronising pulses, freed from picture signals, are fed from the anode of valve 92 to the inner grid of a hexode 93, where they appear in the negative sense, the arrangement being such that no anode current flows when a synchronising pulse is present on the inner grid.

The synchronising pulses are also fed, through a delay network comprising series inductances 94 and shunt condensers 95, to a reversing valve 96 having a resistance 97 in its anode circuit. Each synchronising pulse causes a positive pulse to appear at the anode of valve 96, and these positive pulses are fed through condenser 98 to the outer control grid of hexode 93; the outer control grid is connected through a leak resistance 99 to a source of grid bias 100, which serves to hold the outer grid at such a potential that, normally, no current flows to the anode.

The hexode 93 acts as a switch, the delayed positive pulses from valve 96 tending to open the switch, and the undelayed pulses applied to the inner grid tending to hold it closed. The delayed positive pulses can thus only "open" valve 93, and allow anode current to flow therein, in the absence of negative pulses on the inner grid, and the delay introduced by network 94, 95 is made such that the valve 93 is opened for a part of the black interval of the signal immediately after each synchronising pulse. The anode circuit of valve 93 contains a resistance 101, and the pulses set up at the anode of valve 93 are taken off at 102, through condenser 103, and fed, after being reversed in sign, to an observing valve such as valve 29 of Figure 5.

It is to be noted that in all cases any small phase error between the beginning of the pulse fed to the observing valve and the occurrence of the black level or other signal to be observed may be compensated for by the use of suitable delay networks, which may be inserted either in the channel feeding the observing valve, or in that part of the apparatus in which the signal for actuating the observing valve is generated.

In the above description, there have been described methods of correcting for varying attenuation or for complete or partial absence of the direct current component of signals. For this it has been shown to be sufficient to derive a corrective signal dependent upon the received amplitude of a signal which, at the transmitter, is a fixed value.

Where, however, it is desired to correct for varying attenuation of signals which have no direct current component, for example, signals which have lost their D. C. component, it is necessary to derive a corrective signal dependent upon the difference between two different received amplitudes both of which have fixed values at the transmitter. Thus in the case of a signal of the form shown in Figure 8, it may be assumed that at the transmitter the level B corresponds to picture black and that level P has a fixed difference from value B. Now if such a signal be transmitted through a channel which is incapable of transmitting the D. C. component and which subjects the signals to varying attenuation, the procedure may be as follows:

The signals are given a datum co-incident with the peaks P with the aid of a D. C. re-inserting device of the kind set forth in United States Patent No. 2,252,746, for example, and at the same time they are used to derive a corrective signal dependent upon the amplitude of level B, in the manner already described. As the D. C. re-inserting device ensures that the datum remains on the peaks P and as the corrective signal makes the amplitude P to B substantially correct, the desired corrections will have been applied.

Although the invention has been described in some detail with reference to its application to television systems it is also applicable to other systems in which signals of the requisite character are either present inherently or are arranged to be present for the purpose of enabling a corrective effect to be derived according to the present invention.

Referring to Fig. 13, there is shown a schematic diagram of a system for correcting for varying attenuation. The signal at the transmitter is developed by known means, and in this case an object 100 is focussed onto the mosaic of an "iconoscope" tube 101, and video signals are developed therefrom. Frame synchronising generator 102 and line synchronising generator 103 fed into a modulator and a signal such, for instance, as that illustrated in Fig. 1, is transmitted. At the receiver a portion of the signal is fed to the circuit 14, which corresponds to the circuit 14 hereinbefore referred to with respect to Fig. 4. No further explanation of the operation of the apparatus which has been explained hereinbefore with reference to Fig. 4 is thought to be necessary. The signals from the tube 19 and the point 27 identified in Fig. 4 are fed to the tube 29, such as has been explained hereinbefore on page 3. The output of the valve 29, therefore, is used to operate known automatic gain control apparatus which, in turn, is fed to the receiver schematically illustrated as 110.

What I claim is:

1. An apparatus for re-establishing the direct current component in a television receiver wherein a composite series of picture signals and periodically recurring synchronizing signals are received, the synchronizing signals being immediately followed by a black level signal that varies in amplitude with respect to the alternating current axis of the composite signals in accordance with the average illumination of the view being transmitted, comprising means for separating the synchronizing and black level signals from the picture signals, means for differentiating the synchronizing signals to produce negative and positive impulses of short duration corresponding respectively to the leading and trailing edges of the synchronizing signals, an electron discharge tube having a cathode, a first control electrode, a second control electrode and an anode, means including a load circuit for maintaining the anode positive with respect to the cathode, means for applying the produced short positive impulses corresponding to the trailing edge of the synchronizing impulses to the first control electrode of the electron discharge tube to render said tube conductive, means for applying the synchronizing and black level signals to the second control electrode of the electron discharge tube, whereby the electron discharge tube is rendered conducting during each black level signal interval to thereby produce a potential at the anode of said discharge tube having an intensity corresponding to the intensity of the black level signals.

2. Apparatus for correcting for variations in the effective amplitude of electrical signals representative of intelligence due to the incorrect transmission of the direct current component thereof and wherein said intelligence signals are in the form of trains of signals interpersed with auxiliary signals between trains comprising an observing device including therein a thermionic tube, means for impressing said intelligence signals and said auxiliary signals onto said observing device, means for generating electrical switching pulses, means for impressing said switching pulses onto said thermionic tube for initiating intermittently the development of a signal by said tube whereby a corrective signal proportional to the incorrect direct current component is developed, and means for utilizing said corrective signal to re-insert the correct direct current component.

3. An apparatus for re-establishing the direct current component in a television reproducing device comprising means for receiving signals having a check portion and a datum portion, such signals being transmitted between trains of video signals, rectifying means, means for impressing said received signals onto said rectifying means, normally inoperative corrective signal developing means for developing a corrective signal proportional to the amplitude of the datum signal, thermionic means, means for storing electrical energy under the control of the output of said thermionic means, means for utilizing said stored electrical energy for providing a switching signal, means for controlling the development of the corrective signal intermittently by changing the corrective signal developing means from a normally inoperative state into an operative state under the influence of the switching signal, and means for re-establishing the direct current component by means of said switching signal.

ALAN D. BLUMLEIN.